Sept. 7, 1943.    R. E. GUSTAFSON ET AL    2,328,800
BUTTER CUTTING MACHINE
Original Filed May 28, 1938    2 Sheets-Sheet 1
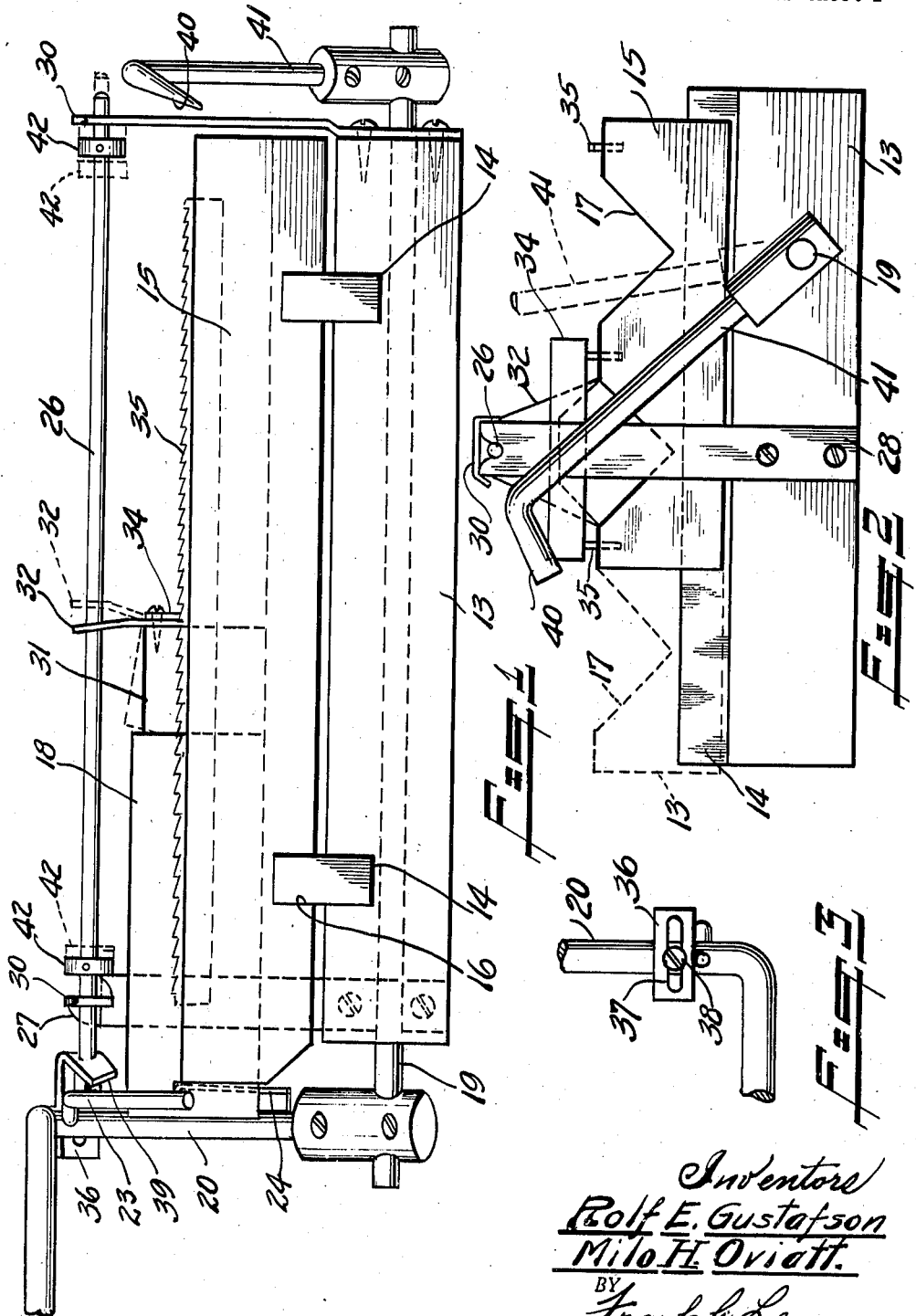
Inventors
Rolf E. Gustafson
Milo H. Oviatt
BY Frank C. Learman.

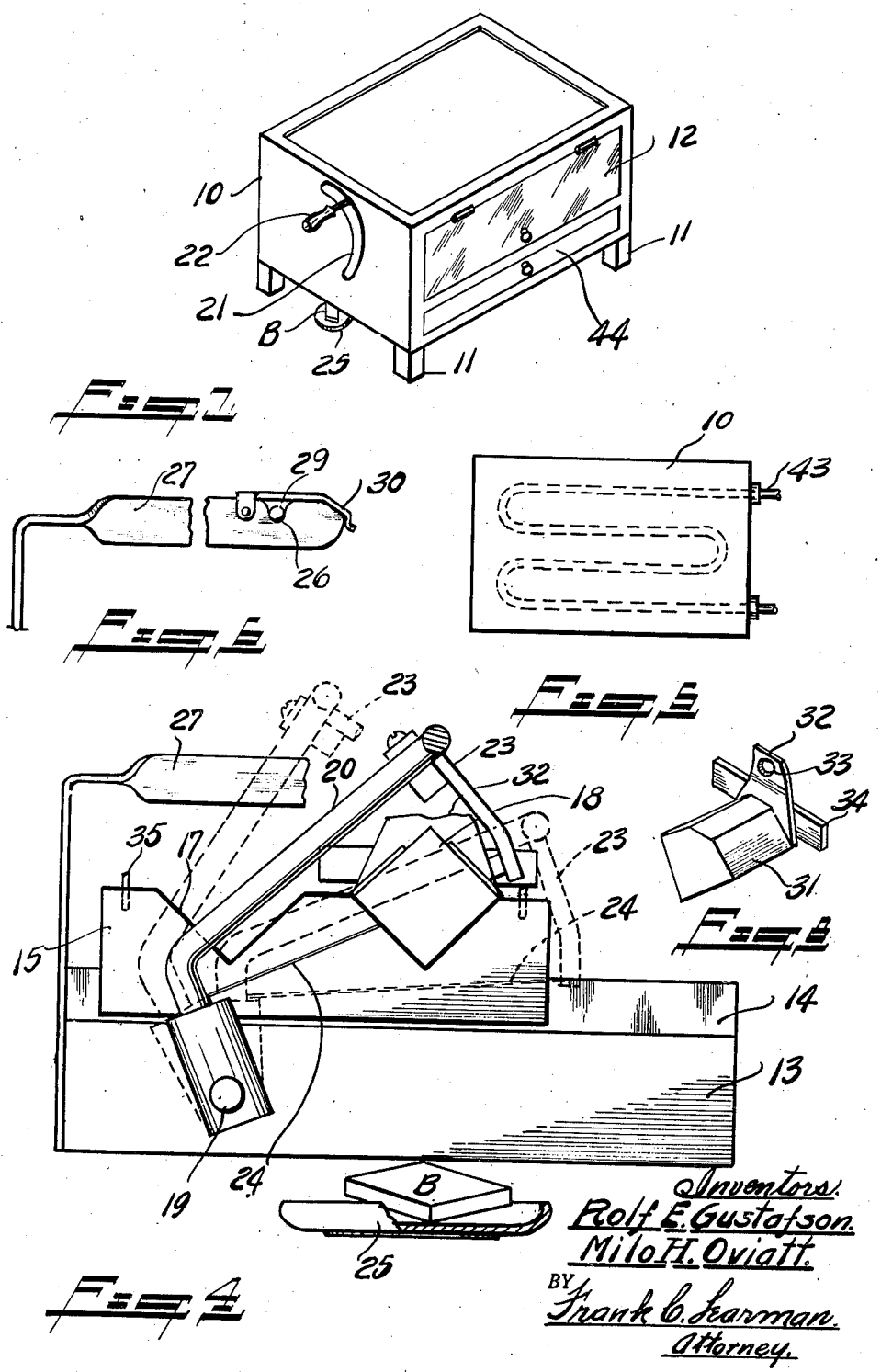

Patented Sept. 7, 1943

2,328,800

UNITED STATES PATENT OFFICE 2,328,800

BUTTER-CUTTING MACHINE

Rolf E. Gustafson and Milo H. Oviatt, Bay City, Mich.

Substituted for abandoned application Serial No. 210,662, May 28, 1938. This application August 24, 1942, Serial No. 456,114

6 Claims. (Cl. 31—20)

This invention relates to butter cutting machines, and more particularly to a machine for use in hotels, restaurants, eating places and other establishments for cutting individual butter patties of predetermined thickness.

One of the prime objects of the invention is to design a sanitary butter patty cutting machine in which the blocks of butter are placed, which is completely closed against dust, flies and insects, and which can be operated to cut the butter patties and deposit them onto a patty dish so that the butter is not touched by human hands.

Another object of the invention is to design a butter patty cutting machine which can be readily cooled or refrigerated, which can be adjusted to cut patties of different thicknesses, and which is of neat and pleasing appearance.

A still further object is to provide a butter patty cutting machine provided with an adjustable and removable butter tray having a plurality of butter troughs therein, which can be readily shifted into position to permit cutting of the butter in the loaded trough when the butter in the first trough has been exhausted, and from which the tray can be readily removed for storage in a refrigerator when desired.

A further object still is to provide a machine of the nature described and provide quickly adjustable feed mechanism for moving the butter in the trough as the machine is actuated, and further provide easily and quickly adjustable means for varying the stroke of the feed mechanism.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view showing our butter patty cutting machine with the case omitted, the broken lines illustrating the movement of the feed unit or assembly.

Fig. 2 is an end view thereof, the broken lines showing the tray and end cam lever in adjusted position.

Fig. 3 is a fragmentary view of the handle with the adjustable clip mounted thereon.

Fig. 4 is an opposite end view to that shown in Fig. 2, the broken lines showing the operating lever in various adjusted positions.

Fig. 5 is a diagrammatic view showing the cooling pipes which can be connected to a suitable refrigerating unit.

Fig. 6 is a fragmentary detail side elevational view of the feed rod support showing also the rod and retaining means.

Fig. 7 is a perspective view of the device enclosed in its cabinet, said cabinet being shown with an inbuilt ice tray.

Fig. 8 is an isometric view of the feed block.

In hotels, restaurants, and the like, the handling of butter patties is not altogether sanitary. A large number of patties are cut at one time and placed together on a dish, the patties stick together, become warm and soft, and are exposed to dust, flies and insects. Often, waitresses handle the patties with their fingers, etc., making an unsanitary proposition which is detrimental to health and proper cleanliness, and these disadvantages we have eliminated in our sanitary patty cutting machine which can be constructed of any desired size, and which can be cooled by ice or by connection to a suitable refrigerating apparatus on the premises.

The instant application is a substitute for application Serial No. 210,662, filed May 28, 1938.

Referring now more particularly to the drawings in which we have shown the preferred embodiment of our invention, the numeral 10 indicates a case or cabinet of suitable size to accommodate the patty cutting mechanism, this cabinet is mounted on legs 11 and is provided with a glass paneled door 12 in the front thereof to afford easy access to the interior of the cabinet so that the butter supply may be replenished, or the tray removed for placing in a refrigerator, for cleaning, repair, or any other purpose.

A base 13 is mounted in this cabinet 10 in any approved manner, and can be formed of wood or metal as desired, spaced apart transverse tracks 14 being provided on the base, and a tray 15 is mounted thereon, transversely disposed grooves 16 being provided on the bottom face of said tray which accommodate the tracks 14 so that the tray readily slides on said tracks.

The tray is formed as clearly shown in Figs. 2 and 4 of the drawings, longitudinally disposed, V-shaped troughs 17 being provided in the face thereof, which are of a size to accommodate an elongated mold of butter 18, one mold being placed in each trough, and when the one mold has been cut into patties, the tray is moved into position so that the mold in the other trough may be cut.

The device is adapted to be manually actuated, a shaft 19 being journaled in the base, and an operating lever 20 is mounted on one end of said shaft, the end of the lever being turned at right angles, with the end projecting through a slotted opening 21 provided in the cabinet, and a handle 22 is mounted on the turned end of the lever for easy manipulation thereof.

A laterally projecting member 23 is mounted on the lever 20, and a thin wire 24 is stretched between the end of said member and the lever 20, and forms the cutting element, which, when the lever is swung down, cuts through the mold of butter and severs a patty B of predetermined thickness, which drops onto a patty dish 25, all as clearly shown in Figs. 4 and 7 of the drawings.

Suitable means must, of course, be provided for feeding the butter in the trough as the lever is actuated, and this comprises a horizontally disposed rod 26, one end of said rod being mounted in an overhanging bracket 27 secured to the rear end of the base, the opposite end being mounted in a bracket 28 secured to the end of the base. Slotted openings 29 are provided in the respective brackets, and are of a size to accommodate the rod, and a resilient clip 30 is provided on each of the brackets to prevent accidental displacement of the rod when the device is operated.

A feed block 31 is mounted on the rod 26 and is adapted to slide in the trough 17, said block comprising a metallic rod engaging member 32, having an opening 33 therein to slidably accommodate the rod 26, said member being slightly bent as shown, and the feed block 31 is secured to the lower end thereof in any approved manner. Wings 34 are provided on the metallic member and engage teeth 35 set in the face of the tray in position to prevent the block moving backward in the trough when the rod 26 is actuated.

The rod 26 is actuated by means of the lever 20, a clip 36 being mounted thereon (see Fig. 3 of the drawings), which is slotted as at 37 to accommodate a screw 38, the face 39 of said clip being bent as shown in Fig. 1, so that when the handle is swung down the cutting element 24 severs a patty from the mold of butter, further downward travel of the lever causing the clip to engage the end of the rod 26, sliding it endwise in the brackets 27 and 28 to the right as indicated in broken lines in Fig. 1, and also slightly tilting the feed block 31 (which is held by the teeth 35), also shown in broken lines in Fig. 1. Then as the handle 22 is swung back preparatory to severing the next patty, the cam-shaped end 40 of the member 41, which is provided on the opposite end of the shaft 19, engages the opposite end of the shaft 26, sliding it back to original position, and the member 32 being slightly bent, binds on the shaft 26 and forces the block and butter mold endwise in the trough a predetermined distance, corresponding to the thickness of the patty desired. Collars 42 are provided on the shaft 26 to eliminate the possibility of excessive end throw when the handle is jerked or violently swung, the range of movement being indicated by the broken lines shown in Fig. 1 of the drawings, and the clip 36 can be adjusted to adjust the travel of the rod 26, and consequently the thickness of the patty.

After the mold of butter in the first trough is exhausted, the operator opens the door 12 and swings the clips 30 so that the feed rod assembly, including the feed block 31, can be raised; he then slides the tray on the tracks 14 so that the loaded trough is in position for cutting, then slides the block 31 back on the rod 26 until it is in the rear of the mold of butter, and he then places the assembly again in brackets, then the operator can resume cutting.

We wish to direct particular attention to the fact that the patties are not touched by human hands, and that the butter is always cold and sealed against dust, flies and insects.

The cooling can be accomplished in any desired manner, and in Fig. 5 we have shown piping 43 which can be mounted in the cabinet beneath the base, and connected to any suitable refrigerating apparatus without interference with the tray or operating mechanism. Where no refrigerating apparatus is available, it may be desirable to use ice for cooling, and under such conditions we provide a pan 44, similar to a drawer, and place small pieces of ice therein, and this provides a very satisfactory cooling arrangement. Under certain conditions, it may be desirable to remove the tray with butter therein and place it in a refrigerator at night, and this can be readily done by merely opening the door 12, raising the rod assembly and sliding the tray out of the cabinet.

The device is simple, practical, and sanitary, the cabinet is of pleasing appearance, the patties can be cut to any desired thickness, they are always cold and firm, and are protected from human contact, dust, flies or insects.

From the foregoing description, it will be obvious that we have perfected a very simple, practical and economical sanitary patty cutting device.

What we claim is:

1. A patty cutting device of the class described and comprising a base, a tray removably and adjustably mounted thereon and having a butter trough therein, a shaft, a feed mechanism mounted on the base and including a horizontally disposed rod, a feed block adjustably mounted on said rod; an operating handle mounted on the shaft, and means carried on each end of said shaft and engageable with the ends of said rod for reciprocating it with relation to the tray, means on said rod for limiting the endwise movement of the rod, and means carried by said operating lever for severing a patty of butter when the lever is actuated.

2. A patty cutting device of the character described comprising a base, a tray adjustably mounted on said base and formed with a butter trough adapted to receive a mold of butter therein, a shaft journaled on said base, brackets on said base, a rod slidably mounted on said brackets, actuating mechanism mounted on the opposite ends of said shaft and adapted to engage the opposite ends of said rod in proper sequence for shifting it back and forth over said tray, a feed block loosely mounted on said rod and slidable in said trough, said block being formed with wings engaging the edges of the trough, an operating lever on said shaft to advance said feed block on the trough on the return stroke of said lever, and a cutting element on said lever for severing a patty of butter when the operating lever is actuated.

3. In a patty cutting device of the class described comprising a cabinet having a base therein, transversely disposed tracks on said base, a removable tray provided with a plurality of butter troughs adjustably mounted on said tracks, each trough being adapted to accommodate a mold of butter therein, a shaft journaled on the base, brackets on said base, a rod shiftably mounted in these brackets, an operating lever on said shaft, an offset cutting element carried by said lever, and a feed block mounted on said rod and slidable in one of said troughs, said block including laterally projecting wings engageable with said tray, and means on said shaft and lever for reciprocating said rod, to progressively move said block in said one of the troughs.

4. In a patty cutting machine of the class described and comprising a cabinet provided with a base, a tray transversely movable on said base and provided with longitudinally disposed troughs, each trough being adapted to receive a mold of butter, a shaft journaled on the base, an operating lever mounted on said shaft, a cutting element carried by said lever, means for progressively feeding the butter in the trough to the cutting element when the lever is actuated, said means including a rod having a feed block slidably mounted thereon, means on said shaft and lever for positively reciprocating said rod when the operating lever is actuated, and means for adjusting the stroke of the reciprocating means.

5. In a patty cutting machine including a cabinet provided with a base having a tray adjustably and removably mounted therein, troughs provided in said tray and adapted to receive molds of butter, a shaft, an operating lever mounted thereon, a cutting element carried by said lever, means for progressively feeding the butter in the troughs and including a horizontally disposed reciprocating rod having a feed block slidably mounted thereon, teeth on said tray and engageable by said block to prevent rearward movement thereof on the return stroke of the rod, and adjustable means on said lever and shaft respectively and engageable with the ends of the rod for actuating said block as the operating lever is swung, said tray being transversely adjustable on said base for selectively bringing one of the troughs into alignment with said feeding and cutting mechanism.

6. A patty cutting machine including a tray adapted to accommodate a mold of butter, a shaft, an operating lever mounted on said shaft, a feed mechanism including a horizontally disposed rod, a feed block loosely mounted on said rod, cam levers mounted on said shaft and adapted to engage the opposite ends of the rod in proper sequence to reciprocate said rod and progressively move said block to feed the butter along said trough on the return stroke of the lever, means on said tray and engageable by said block to prevent backward movement of the block, and a cutting element on said lever for cutting said butter to form a patty as the lever is actuated.

ROLF E. GUSTAFSON.
MILO H. OVIATT.